(12) United States Patent
Rueckert et al.

(10) Patent No.: US 7,936,947 B1
(45) Date of Patent: May 3, 2011

(54) METHOD OF PROCESSING IMAGE DATA

(75) Inventors: Daniel Rueckert, London (GB);
Kanwal Kaur Bhatia, London (GB)

(73) Assignee: Imperial Innovations Limited, London (GB)

( * ) Notice: Subject to any disclaimer, the term of this patent is extended or adjusted under 35 U.S.C. 154(b) by 1153 days.

(21) Appl. No.: 11/547,756

(22) PCT Filed: Apr. 14, 2005

(86) PCT No.: PCT/GB2005/001446
§ 371 (c)(1),
(2), (4) Date: Oct. 6, 2006

(87) PCT Pub. No.: WO2005/101299
PCT Pub. Date: Oct. 27, 2005

(30) Foreign Application Priority Data

Apr. 14, 2004 (GB) .................................. 0408328.3

(51) Int. Cl.
*G06K 9/40* (2006.01)
(52) U.S. Cl. ........ 382/294; 382/260; 382/274; 382/275; 358/3.26; 358/3.27; 358/463
(58) Field of Classification Search .................. 382/128, 382/130, 131
See application file for complete search history.

(56) References Cited

U.S. PATENT DOCUMENTS

| | | | |
|---|---|---|---|
| 6,611,615 B1 | 8/2003 | Christensen | |
| 6,817,982 B2 * | 11/2004 | Fritz et al. ..................... | 600/443 |
| 7,045,255 B2 * | 5/2006 | Misaka .............................. | 430/5 |
| 7,222,133 B1 * | 5/2007 | Raipurkar et al. ............. | 707/642 |
| 7,234,645 B2 * | 6/2007 | Silverbrook et al. .......... | 235/494 |
| 7,246,268 B2 * | 7/2007 | Craig et al. ..................... | 714/42 |
| 7,250,248 B2 * | 7/2007 | Misaka ........................... | 430/311 |
| 7,254,278 B2 * | 8/2007 | Jung ................................ | 382/261 |
| 7,290,275 B2 * | 10/2007 | Baudoin et al. .................. | 726/1 |
| 2004/0017932 A1 | 1/2004 | Yang .............................. | 382/118 |
| 2008/0137969 A1 | 6/2008 | Rueckert et al. ............... | 382/224 |

FOREIGN PATENT DOCUMENTS

WO WO 2005/101298 10/2005

OTHER PUBLICATIONS

U.S. Appl. No. 11/547,755, filed Oct. 6, 2006, Daniel Rueckert, Response to Non-Final Office Action, Apr. 28, 2010.
U.S. Appl. No. 11/547,755, filed Oct. 6, 2006, Daniel Rueckert, Non-Final Office Action, Oct. 28, 2009.
U.S. Appl. No. 11/547,755, filed Oct. 6, 2006, Daniel Rueckert, Preliminary Amendment, Apr. 21, 2008.
PCT/GB2005/001446, Apr. 14, 2005, Imperial College Innovations Limited, International Search Report, Nov. 28, 2005.
PCT/GB2005/001445, Apr. 14, 2005, Imperial College Innovations Limited, International Search Report, Nov. 29, 2005.
Ashburner, J. *Computational Neuroanatomy*, University College London (2000).

(Continued)

*Primary Examiner* — Yosef Kassa
(74) *Attorney, Agent, or Firm* — Ballard Spahr LLP

(57) ABSTRACT

A method of processing image data for registration of multiple images to a common reference space comprising the step of computing a mapping between each image and a common reference image comprising an average of all of the images.

9 Claims, 2 Drawing Sheets

OTHER PUBLICATIONS

Figure 1A:
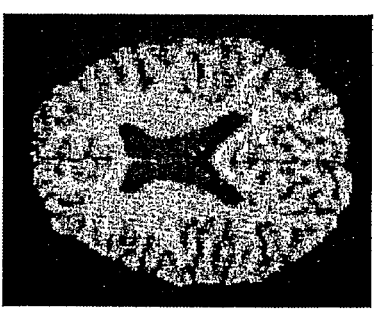

Ashburner, J., *Computational Neuroanatomy*, SPM Short Course Slides (28 slides) (http://www.fil.ion.ucl.ac.uk/spm/course/slides02/spatial/welcome), (2004).

Ashburner, J. and Friston, K.J., *Voxel-Based Morphometry—The Methods*, Neuro-Image 11, pp. 805-821 (2000).

Ashburner, J. et al., *Identifying Global Anatomical Differences: Deformation-Based Morphometry*, Neural Brain Mapping, pp. 348-357 (1998).

Bhatia, K.K., et al., *Consistent Groupwire Non-Rigid Registration for Atlas Construction*, Proceedings of the 2004 IEEE International Symposium on Biomedical Imaging: From Nano to Macro, Arlington, VA, IEEE 2004, pp. 908-911 (Apr. 2004).

Gaser, C. et al., *Deformation-Based Morphometry and its Relation to Conventional Volumetry of Brian Lateral Ventricles in MRI*, NeuroImage, vol. 13, pp. 1140-1145 (2001).

Golland et al., *Permutation Tests for Classification: Towards Statistical Significance in Image-Based Studies*, Jul. 2003, pp. 330-341.

Guimond, A. et al., *Average Brain Models: A Convergence Study*, Computer Vision and Image Understanding, Academic Press, San Diego, CA, vol. 77, No. 2, pp. 192-210, XP004439302 ISSN: 1077-3412 (Feb. 2000).

Lao, Z. et al., *Morphological classification of brains via high-dimensional shape transformations and machine learning methods*, NeuroImage 21, pp. 46-57 (2004).

Marsland, S. et al., *Groupwise non-rigid registration using polyharmonic clamped-plate splines*, in Sixth Int. Conf. on Medical Image Computing and Computer-Assisted Intervention (MICCAI '03), Lecture Notes in Computer Science, pp. 771-779, Soringer-Verlag (2003).

McLachlan, G.J., *Discriminant Analysis and Statistical Pattern Recognition*, Wiley, NY, XP002354471, pp. 129-167 (1992).

Pluim, J. et al., *Mutual-Information-Based Registration of Medical Images: A Survey*, IEEE Transactions on Medical Imaging, vol. 22, No. 8, pp. 986-1004, XP001233412 ISSN: 0278-0062 (Feb. 2002).

Rueckert, D. et al., *Nonrigid Registration Using Free-Form Deformations: Application to Breast MR Images*, IEEE Transactions on Medical Imaging, vol. 18, No. 8, pp. 712-721 (1999).

Rueckert, D., Clarkson, M. et al., *Non-rigid registration using higher-order mutual information*, Proceedings of the SPIE, SPIE, Bellingham, VA, vol. 3979, pp. 438-447, XP008055221 ISSN: 0277-786X (Feb. 2000).

Rueckert, D., Frangi, A. et al., *Automatic Construction of 3-D Statistical Deformation Models of the Brain Using Nonrigid Registration*, IEEE Transactions on Medical Imaging, vol. 22, No. 8, pp. 1014-1025, XP001233414 ISSN: 0278-0062 (Aug. 2003).

Schnabel, J. et al., *A Generic Framework for Non-rigid Registration Based on Non-uniform Multi-level Free-Form Deformations*, in Medical image computing and computer-assisted intervention—MICCAI, pp. 573-581 (2001).

Studholme, C., Hill, D. et al., *An overlap invariant entropy measure of 3D medical image alignment*, Pattern Recognition, vol. 32, No. 1, pp. 71-86 (1999).

Studholme, C., Cardenas, V. et al., *Multi scale image and multi scale deformation of brain anatomy for building average brain atlases*, Proceedings of SPIE, SPIE, Bellingham, VA, vol. 4322, No. Part 1-3, pp. 557-568, XP001199572 ISSN: 0277-786X (2001).

Studholme, C., *Simultaneous Population Based Image Alignment for Template Free Spatial Normalisation Brain Anatomy*, Lecture Notes in Computer Science, vol. 2717, p. 81-90, XP002353702 (2003).

Thomaz, C.E., Gillies, D. et al., *A New Quadratic Classifier Applied to Biometric Recognition*, Lecture Notes in Computer Science, Springer Verlag, New York, NY, vol. 2359, pp. 186-196, XP008054788 ISSN: 0302-9743, (2002).

Thomaz, C.E. and Gillies, D., *A New Fisher-Based Method Applied to Face Recognition*, Lecture Notes in Computer Science, Springer Verlag, New York, NY, vol. 2756, pp. 596-605, XP008054793 ISSN: 0302-9743, (2003).

Thomaz, C.E. et al., *Using a Maximum Uncertainty LDA-Based Approach to Classify and Analyse MR Brain Images*, Lecture Notes in Computer Science, Springer Verlag, New York, NY, vol. 1, pp. 291-300, XP008054794 ISSN: 0302-9743 (2004).

Thomaz, CE. and Gillies, D., *A Maximum Uncertainty LDA-based approach for Limited Sample Size problems—with application to Face Recognition*, XP002354468, London, UK, pp. 1-19 (2004).

* cited by examiner

METHOD OF PROCESSING IMAGE DATA

The invention relates to a method of processing image data, in particular a method of registering images.

Image registration techniques comprise applying transforms to images of a common type so that all are mapped onto a reference space effectively allowing normalisation of all of the images. Image registration hence allows comparison of images against a common baseline. Image registration extends to 3D techniques in which, for each coordinate (x, y, z) an intensity or colour value is stored and the (x, y, z) coordinates are mapped to the reference space. Image registration can be used for spatial normalisation wherein a population of images of objects of a similar type are mapped to a common spatial reference. Alternatively, image registration can be used for temporal normalisation, for example where an object deforms and changes with time and it is desired to view the changes whilst filtering out the movement caused by the motion of the object.

One area in which image registration is an important tool is medical image analysis. The use of high-dimensional non-rigid registration algorithms for registering multiple images to a common reference allows techniques such as computational morphometry or the creation of population-specific atlases. In those techniques spatial normalisation of the population of the images is carried out and each image is transferred to the coordinate system of a chosen reference anatomy to build an "atlas" of normalised images.

In known systems a pairwise registration algorithm is used to find the mappings from points in the reference space to points in the coordinate system of each image separately. According to this approach a reference subject or image is selected from the population being studied and each of the other images transformed so as to map onto it. A problem with this approach is that the reference may not be truly representative of the population, particularly if there is wide variation within the group as can be the case, for example, in studies of neurodegenerative disorders (dementias such as Alzheimer's disease) or neonatal brain development. Additionally, if the deformations required to transform one image into another are too large, the performance of the registration algorithm may be degraded. This can happen if the chosen reference subject represents one extremum of the population under investigation. Furthermore the atlas created, and any resulting calculations such as volume measurements, are also dependent on the choice of reference subject which can strongly bias the atlas produced.

One alternative approach is proposed by Marsland et al "Group-wise non-rigid registration using polyharmonic clamped-plate splines," in *Sixth Int. Conf. on Medical Image Computing and Computer-Assisted Intervention (MICCAI '03)*. 2003, Lecture Notes in Computer Science, pp. 771-779, Springer-Verlag. According to this approach the selected reference image is that image which minimises the sum of distances between itself and the other images. However this registration is still essentially pairwise from each image to the reference and the reference must still exist within the population. As a result the registration will still suffer from the shortcomings described above.

A further alternative approach is proposed by Studholme "Simultaneous population based image alignment for template free spatial normalisation of brain anatomy," in *Biomedical Image Registration—WBIR*, 2003, pp. 81-90. According to this proposal, the group of images is simultaneously aligned to a common space using high-dimensional non-rigid registration. A cost function is constructed to minimise the uncertainty in intensity alignment between the images. In order to further constrain the infinite number of sets of transformations which bring these structures into correspondence in this way, the cost function additionally includes penalty terms penalizing divergence from the average shape of brains in the group and non-smoothness of the solution. However such an approach is computationally inefficient and cannot guarantee convergence towards the average, non-biased shape but only to an approximation, accuracy of convergence being dependent on the weighting parameter selected. Furthermore, the approach introduces new a priori user-chosen parameters which define a trade-off between the goodness of the alignment of the images and the degree of bias.

The invention is set out in the claims. As a result of the approach adopted a non-biased, average reference is adopted with reduced computational burden. A high-dimensional non-rigid registration algorithm can be adopted to conduct a simultaneous registration across the whole group of images in which a fixed constraint is preferably applied to the optimization to force the sum of deformations from the reference space to the images to be zero; the similarity between the images is maximized, subject to this constraint always being satisfied.

Embodiment of the invention will now be described, via example, with reference to the drawings of which:

FIGS. 1*a* to 1*g* show an exemplary population and corresponding mappings; and

Figure 2:
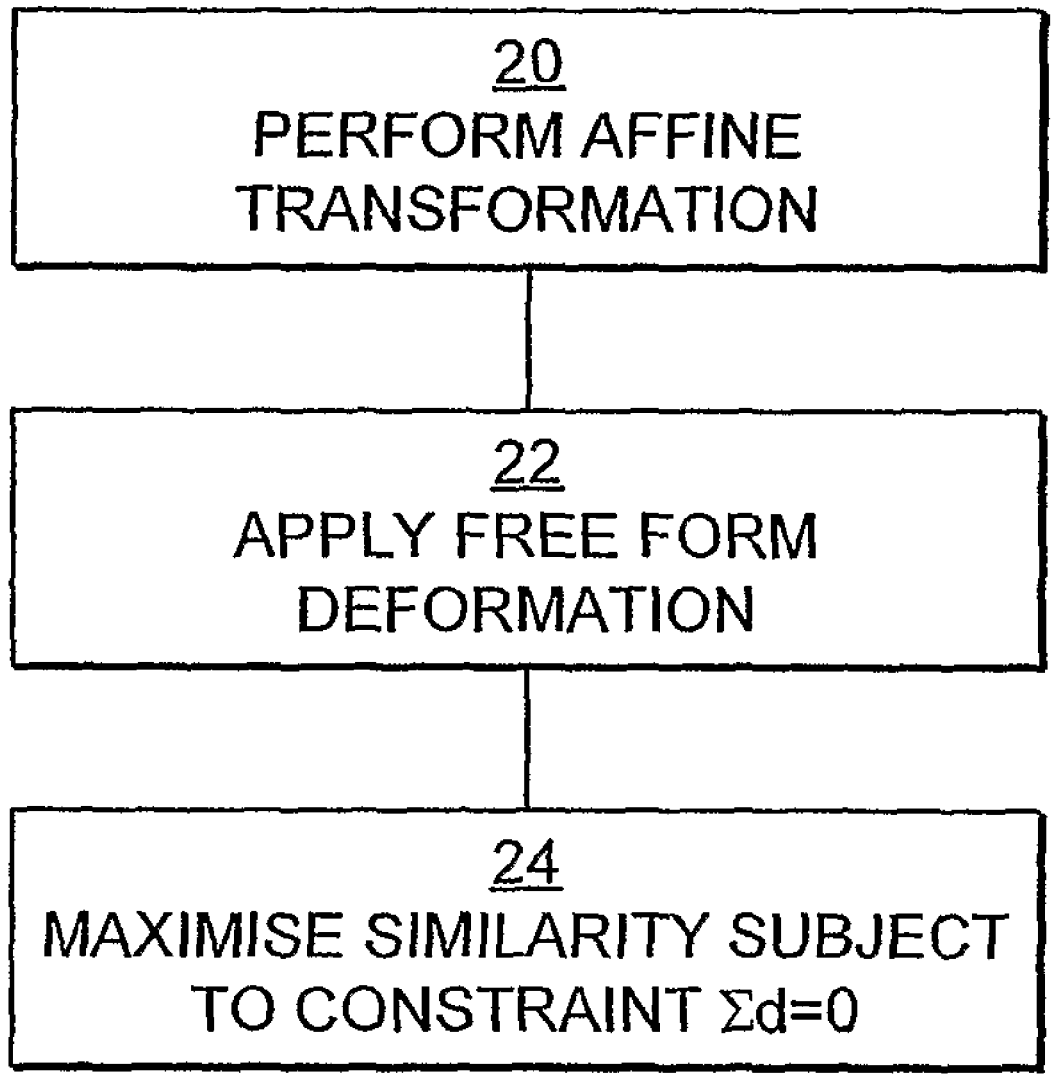

FIG. 2 is a flow diagram illustrating the steps performed according to the invention.

In overview the invention provides a method of transforming a set of images simultaneously to a common, average reference using a groupwise, non-rigid registration algorithm to simultaneously register all the subjects in the population to a common reference (or natural) coordinate system which is defined to be the average of the population. In order to find the average of the population, the sum of all deformations from the reference coordinate system to each subject is constrained to a value of zero as a result of which the reference coordinate system is calculated implicitly. Within this constraint similarity between the images is maximized using the gradient projection method for constrained optimization as discussed in more detail below.

As a result simultaneous registration of all subjects to a implicitly derived reference representing the average shape of the population is achieved minimising the distance between the images and the known reference. By registering all the images simultaneously the resulting deformation fields furthermore contain information about the variability across the group such that any inferences drawn are with respect to the population as a whole. As a result the approach avoids altogether the need to choose a reference subject and the compromises required in known pairwise registration approaches.

The invention can be understood in more detail with reference to FIGS. 1 and 2.

Figure 1B:
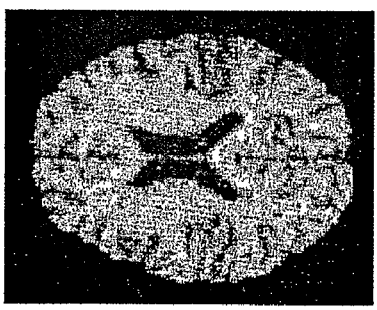
Figure 1C:
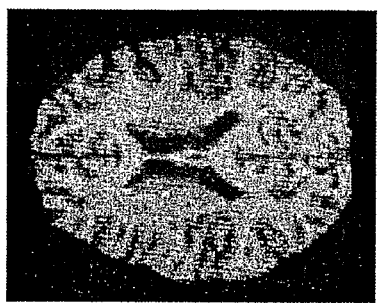
Figure 1D:
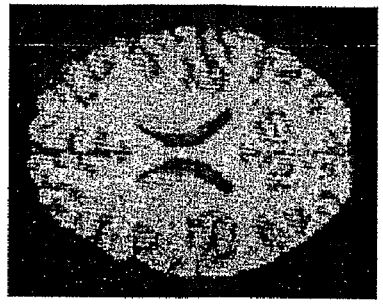

Referring firstly to FIGS. 1*a* to 1*g*, FIGS. 1*a* and 1*d* show images of two brain MRI (magnetic resonance images) taken from a population with clearly different anatomies. The images are registered simultaneously to a frame of reference that is the average of the two anatomies. The mapped images for the subjects of FIGS. 1*a* and 1*d* are shown in FIGS. 1*b* and 1*c* respectively.

Figure 1E:
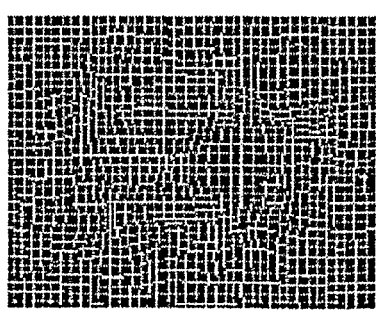

As discussed above, and as described in more detail below, the similarity between the images is maximized in the mapped images in FIG. 1*b* and FIG. 1*c* subject to the constraint that the sum of the deformation fields used is zero. This can be understood further with reference to FIGS. 1*e* to 1*f*. FIG. 1*e* shows the "deformation field" applied to the image of FIG. 1a to arrive at FIG. 1b. In particular FIG. 1e shows the displacement of each control point, or intersection between a rectilinear grid placed over FIG. 1a in order to arrive at the image in FIG. 1b. Similarly FIG. 1f shows the deformation field applied to the image of FIG. 1d to arrive at the image of FIG. 1c.

Figure 1F:
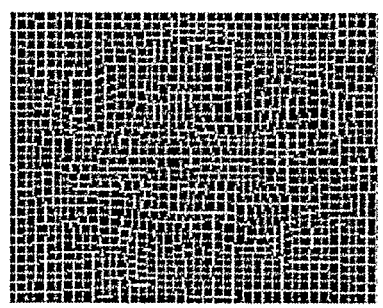
Figure 1G:
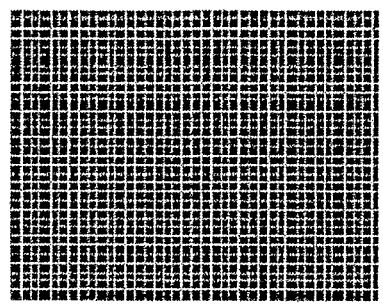

In order to satisfy the constraint, the sum of these deformation fields must provide a total displacement of zero at each control point in order that the reference space is exactly half-way between the two anatomies and FIG. 1g shows the superposition of the deformation fields of FIG. 1e and FIG. 1f to show that a pure rectilinear grid is once more arrived at, i.e. the constraint is satisfied.

It will be recognized that a very simple example is displayed with reference to FIG. 1 with only two subjects and in three dimensions. The approach can be applied similarly to any number of brain images in two-dimensions or three-dimensions or in addition incorporating a time dimension as appropriate. Furthermore, it will be appreciated that increasing the resolution of the grid or mesh representing the deformation field will improve the clarity of the atlas.

An appropriate algorithm for registering the image can be understood with reference to the flow diagram of FIG. 2.

In the first step 20 of the registration algorithm a global component of the transformation is first carried out. The global component is represented by an affine transformation consisting of translations, rotations, scaling and shearing and describes overall differences between the subjects. It is then necessary to apply a local component of the registration algorithm to apply mappings for any local deformation required to match portions of the anatomies of the subjects more closely. Accordingly at step 22 an appropriate non-rigid registration algorithm is applied and in the embodiment described a free-form deformation (FFD) model based on B-splines is used. The skilled person will be fully familiar with this technique which is a powerful tool for modeling 3D deformable objects and which is described in, for example, Rueckert et al, "Non-rigid registration using free-form deformations: Application to breast MR images," *IEEE Transactions on Medical Imaging*, vol. 18, no. 8, pp. 712-721, 1999 and Schnabel et al, "A generic framework for non-rigid registration based on non-uniform multi-level free-form deformations," in *Medical image computing and computed-assisted intervention— MICCAI*, 2001, pp. 573-581 and hence the approach will not be described in detail but only in summary.

FFDs deform an object by manipulating an underlying mesh of control points $\Phi$; the resulting deformation controls the shape of the object. Such a mesh of control points is shown in FIG. 1g (undeformed) and FIGS. 1e and 1f as described above. Increasing the resolution of the control point lattice increases the amount of local deformation that can be achieved. In one approach a collection of FFDs $d_i$, over the domain $\Omega$, are used to deform each subject i to the common reference coordinate system, written here as the 3D tensor product of 1d cubic B-splines:

$$d_i(x) = \sum_{l=0}^{3} \sum_{m=0}^{3} \sum_{n=0}^{3} B_l(u) B_m(v) B_n(w) \phi^i_{a+l,b+m,c+n} \quad (1)$$

For example, in the embodiment described above with reference to FIG. 1, the images are image 1 (FIG. 1a) and image 2 (FIG. 1d) and the deformations $d_1$, $d_2$ are shown in FIGS. 1e and 1f respectively.

At step 24 the similarity between the images is maximized. Once again referring to FIG. 1, in particular it is desirable that the transformations of images 1 (FIG. 1a) and image 2 (FIG. 1d) in the reference space as shown in FIGS. 1b and 1c respectively are as similar as possible. One appropriate approach is to apply normalised mutual information (NMI). This technique will be well known to the skilled person and is described, for example in Studholme et al, "An overlap invariant entropy measure of 3D medical image alignment," *Pattern Recognition*, vol. 32, no. 1, pp. 71-86, 1998. Accordingly only a summary of the technique is provided here.

In order to reduce the computational burden an arbitrary image from the initial population is selected to act as an intensity reference against which each other image is compared pairwise to allow a measure of similarity to be adopted. It will be noted that the arbitrarily selected image is being used only as an intensity reference but not as an anatomical reference and hence does not affect selection of a common, average reference field. Alternatively, all of the images in the population could be compared although this would require an n-dimensional histogram for n images.

Accordingly, all pairs of intensities, comprising the voxel intensity (intensity value at each coordinate (x, y, z)) in the reference and the corresponding intensity in each image are added to the same joint histogram to evaluate the NMI using:

$$S(X_{ir}, X) = \frac{H(Xir) + H(X)}{H(X_{ir}, X)} \quad (2)$$

where $H(X_{ir})$ represents the marginal entropy of the intensity reference, $H(X)$ represents the marginal entropy of the combined set of images and $H(X_{ir}, X)$ denotes their joint entropy.

Equation 2 is hence used to maximize the similarity between all of the images based on finding a common intensity profile. However, in order to ensure that an average of the image is found, the sum of the deformations, as discussed above, must be equal to zero. Accordingly, to find the optimal non-rigid transformation that aligns all subjects to an average reference shape, a control point lattice is overlaid onto each subject, as discussed above, with reference to FIGS. 1a to 1g. The control points are displaced, deforming the underlying image until the similarity between the images is maximized, subject to the constraint that the sum of all deformation is equal to zero. This can be expressed as:

$$\sum_{i=1}^{n} d_i(x) = 0 \ \forall \ x \in \Omega \quad (3)$$

Since the deformation fields are linearly dependent on the control point displacements, this is equivalent to constraining the sum of the displacements of each control point to be zero.

It will be appreciated that alternative methods of maximizing the similarity within the atlas of mapped images can be adopted and that this can be solved subject to the constraint set out in Equation (3) in any appropriate manner. One approach adopted here is to use the gradient projection method proposed by Rosen. The skilled reader will be familiar with this approach which is described in D. G. Luenberger, *Introduction to linear and nonlinear programming*, Addison-Wesley, 1973 and so the approach, which is comparable to the method of steepest desent for unconstrained optimization is described only in summary here. In particular, at each iteration, the directions of movement of the control points $\delta$ are found by calculating the gradient g of the similarity function with respect to the control point displacements. This is then multiplied by a projection matrix P which projects the objective function onto the constraint surface, after which the method reduces to steepest descent along the constraint.

$$\delta = -Pg \quad (4)$$

where P is a block diagonal matrix and is a function of the constraints only.

As a result it will be seen that a simple and effective measure is provided for mapping the population to a reference space.

It will be appreciated that the approach can be implemented in any appropriate manner and in hardware, firmware or software as appropriate. In view of the potential computational burden the approach can be distributed across multiple intercommunicating processes which may be remote from one another.

The approach can be applied to any area of image registration, for example, brain images such as shown in FIG. 1.

It will further be appreciated that any appropriate algorithms and techniques can be adopted for maximizing similarity and for applying the constraints, as appropriate.

Furthermore because full information is derived concerning the mapping in each case, further information concerning the similarity of the subject images can be derived from the mappings. For example, an analysis technique such as deformation- or tensor-based morphometry (Gaser et al, "Deformation-based morphometry and its relation to conventional volumetry of brain lateral ventricles in MRI," *NeuroImage*, vol. 13, pp. 1140-1145, 2001) can be applied to the mappings to analyse the deformations without having a bias in the analysis.

One possible application of the method described in is image recognition. For example, face recognition can be performed by aligning face images within a database and comparing new faces to the mean face and its principal modes of variation as calculated using techniques well known in the art such as principal component analysis (PCA) and linear discriminant analysis (LDA). As an alternative possibility, information about an "average" anatomical structure and its statistical variability can be derived from a population of samples which can be of benefit, for example, in design and construction of artificial anatomical structures such as bones and prostheses.

The invention claimed is:

1. A method of processing image data to register at least two subject images comprising the steps of:

computing a direct mapping between each subject image and a common reference image comprising an average of the subject images, wherein each mapping includes a deformation and the mappings are constrained such that the sum of the deformations of all subject images is minimized; and outputting said direct mapping to an output device.

2. The method as claimed in claim 1 in which the sum of the deformations of all subject images is zero.

3. The method as claimed in claim 1 in which the mappings are computed such that the similarity of the mapped images is maximized.

4. The method as claimed in claim 3 in which similarity is maximized using normalized mutual information.

5. The method as claimed in claim 1 in which the mappings include a free form deformation step.

6. The method of claim 1 further comprising performing principal component analysis on each computed mapping.

7. The method of claim 1 further comprising performing image recognition on a mapped image.

8. A computer-readable medium with a computer program recorded thereon, the computer program comprising computer code instructions for implementing a method of processing image data to register at least two subject images, wherein said computer program medium comprises:

a first computer code instruction portion for computing a direct mapping between each subject image and a common reference image comprising an average of the subject images, wherein each mapping includes a deformation and the mappings are constrained such that the sum of the deformations of all subject images is minimized; and a second computer code instruction portion for outputting said direct mapping to an output device.

9. A system for processing image data to register at least two subject images comprising:

a computer system that includes a processor, wherein said processor is configured for:

computing a direct mapping between each subject image and a common reference image comprising an average of the subject images, wherein each mapping includes a deformation and the mappings are constrained such that the sum of the deformations of all subject images is minimized; and outputting said direct mapping to an output device.

* * * * *